(12) United States Patent
Eiswerth et al.

(10) Patent No.: US 7,930,082 B2
(45) Date of Patent: Apr. 19, 2011

(54) FAIL-SAFE APPARATUS AND METHOD FOR DISPOSAL OF AUTOMOBILE PYROTECHNIC SAFETY DEVICES

(75) Inventors: David Eiswerth, Wixom, MI (US); Ganesh Ram Venkatraman, Canton, MI (US); Jorgen Ingvar Carlsson, Åby (SE); Colm Boran, Novi, MI (US)

(73) Assignee: Autoliv ASP, Inc., Ogden, UT (US)

( * ) Notice: Subject to any disclaimer, the term of this patent is extended or adjusted under 35 U.S.C. 154(b) by 528 days.

(21) Appl. No.: 12/154,122

(22) Filed: May 20, 2008

(65) Prior Publication Data

US 2009/0292422 A1 Nov. 26, 2009

(51) Int. Cl.
 *B60R 21/30* (2006.01)
 *G06F 17/00* (2006.01)
(52) U.S. Cl. ............... 701/45; 701/46; 701/34; 280/738
(58) Field of Classification Search .................. 701/45, 701/46, 29, 34; 713/150; 280/738
 See application file for complete search history.

(56) References Cited

U.S. PATENT DOCUMENTS

| | | | |
|---|---|---|---|
| 6,088,639 A | 7/2000 | Fayyad et al. | |
| 6,273,771 B1 | 8/2001 | Buckley et al. | |
| 6,290,255 B1 | 9/2001 | Stanley et al. | |
| 6,293,583 B1 | 9/2001 | Fujishima et al. | |
| 6,430,164 B1 | 8/2002 | Jones et al. | |
| 6,587,769 B2 | 7/2003 | Otterbach et al. | |
| 6,598,900 B2 | 7/2003 | Stanley et al. | |
| 6,898,498 B1 | 5/2005 | Wessels et al. | |
| 2006/0113840 A1 | 6/2006 | Schou et al. | |
| 2008/0272580 A1* | 11/2008 | Breed | 280/735 |

OTHER PUBLICATIONS

ISO Draft International Standard 26021: Road vehicles—End of life activation of on-board pyrotechnic devices—Part 2: Communication requirements, Mar. 11, 2006, 66 pages.

* cited by examiner

*Primary Examiner* — Tan Q Nguyen

(57) ABSTRACT

A method for disposing of a pyrotechnic safety device includes providing an electronic control unit having a primary control unit and an auxiliary control unit. The auxiliary control unit includes a safing mode and a scrap mode, and operates in the safing mode in an initial state. The auxiliary control unit is switched from the safing mode to the scrap mode when the primary control unit sends a first predetermined signal. The auxiliary control unit is armed only if it receives a second predetermined signal from the primary control unit while the auxiliary control unit is operating in the scrap mode. The primary control unit sends the first and second predetermined signals to the auxiliary control unit based on signals the primary control unit receives from an external source. The primary control unit then disposes of a pyrotechnic safety device (PSD) by sending a deployment signal to the PSD based on another signal received from the external source.

23 Claims, 7 Drawing Sheets

FAIL-SAFE APPARATUS AND METHOD FOR DISPOSAL OF AUTOMOBILE PYROTECHNIC SAFETY DEVICES

BACKGROUND

The present invention relates generally to pyrotechnic safety device disposal and more particularly to fail-safe automotive pyrotechnic safety device disposal.

Automotive vehicles typically contain a passive restraint system that includes a variety of pyrotechnic safety devices (PSD's) and an array of crash sensors. In the event of a vehicle crash, the PSD's are activated or deployed in response to signals received from the crash sensors in order to mitigate injury to vehicle occupants. Examples of PSD's include air bags, seat belt pretensioners, deployable roll bars, deployable knee bolsters, deployable anti-submarining devices, and "pop-up" pedestrian safety hoods.

At the end of a vehicle's useful life, a number of undeployed "live" PSD's may remain in the vehicle. Due to their pyrotechnic nature, government regulations in many countries prohibit the removal, storage, and reuse of PSD's for safety reasons. Recently, many governments have also implemented regulations prohibiting disposal of vehicles containing undeployed PSD's, and now require that all undeployed PSD's be deployed prior to disposal of the vehicle. One such regulation is embodied in the ISO 26021 draft protocol, which requires the vehicle's restraint system controller to receive and act upon PSD disposal commands from an external device.

Because the primary objective of an automatic restraint system is to mitigate injury to vehicle occupants during a crash, it is desirable to activate PSD's only in certain vehicle impact conditions, when a collision event is identified to be significant enough to cause injury to the occupant(s).

In order to prevent inadvertent or unwanted deployments of PSD's, automatic restraint system controllers are typically designed to be "fail-safe," such that no single component of the system can fail in a way that would cause deployment current to flow to the PSD. Generally, this fail-safe configuration is achieved by arranging a plurality of independent impact sensors, evaluation logic circuits, and deployment control hardware to only allow deployment current to flow when each individual component achieves a predetermined deployment state. However, the fail-safe configuration of the automatic restraint system controllers make it difficult to manually dispose of PSD's safely prior to disposal of the vehicle because the predetermined deployment state is typically achieved by sensory input indicating a crash event.

Thus, typical restraint system architecture runs contrary to regulations such as the ISO 26021 draft protocol, which requires PSD disposal deployments to be controlled through a single communication port. In order to achieve deployment through a single communication port, the associated control logic essentially bypasses many of the automatic restraint system controller's built-in interlocks and redundancies, which may potentially introduce additional risk of inadvertent deployment into the system if the individual components' failure modes are not properly managed.

Therefore, a need presently exists for a fail-safe method and apparatus for disposing of a pyrotechnic safety device that is compliant with new government regulations, such as the ISO 26021 draft protocol.

SUMMARY

In one aspect of the present invention, a method for disposing of a pyrotechnic safety device may include providing an electronic control unit having a primary control unit and an auxiliary control unit. The auxiliary control unit includes a safing mode and a scrap mode, and operates in the safing mode in an initial state. When the auxiliary control unit receives a first predetermined signal from the primary control unit, the auxiliary control unit is switched from the safing mode to the scrap mode. The auxiliary control unit is armed only if it receives a second predetermined signal from the primary control unit while the auxiliary control is operating in the scrap mode. A single PSD is deployed by sending a deployment signal to the PSD while the auxiliary control unit is armed.

In another aspect, the deployment signal is sent from the primary control unit to the PSD, based on signals received from an external source. The primary control unit sends the first predetermined signal to the auxiliary control unit after receiving a first signal from an external signal source. The primary control unit sends the second predetermined signal to the auxiliary control unit after receiving a second signal from the external signal source. The external signal source may be a CAN based tester, which may not be in communication with the auxiliary control unit.

In yet another aspect of the present invention, a method of disposing of a pyrotechnic safety device may include storing encrypted data in a memory of a primary control unit. The encrypted data corresponds to a plurality of predetermined signals. A decryption key is determined based on multiple signals received by the primary control unit from an external signal source, and at least a portion of the encrypted data corresponding to a first and second predetermined signal is decoded using the decryption key.

In another aspect of the present invention, the auxiliary control unit is reset to the safing mode when a disposal session is terminated, and the decryption key and decrypted data may be destroyed.

Another method for disposing of a pyrotechnic safety device in accordance with this invention includes providing an electronic control unit comprising a primary control unit and an auxiliary control unit, where the auxiliary control unit is operable in a safing mode and a scrap mode. A disposal seed is sent from the auxiliary control unit to the primary control unit when the auxiliary control unit operates in the scrap mode. A disposal key is calculated based on the disposal seed, and the auxiliary control unit is armed when the primary control unit sends the disposal key to the auxiliary control unit. A single pyrotechnic device is deployed by sending a deployment signal to the pyrotechnic device while the pyrotechnic device is armed. The disposal key may be a unique periodic message.

In one embodiment, the auxiliary control unit may be disarmed after deployment, and may be rearmed if another disposal signal is received by the primary control unit. A second pyrotechnic device may be deployed when the auxiliary control unit receives the disposal signal, and the primary control unit sends a deployment signal to the pyrotechnic device while the auxiliary control unit is armed.

A system for disposing of a pyrotechnic safety device may include an electronic control unit having an auxiliary control unit and a primary control unit. The primary control unit is in electronic communication with the auxiliary control unit, and the auxiliary control unit is configured to operate in a safing mode and a scrap mode. The system also includes a pyrotechnic safety device that is in electronic communication with the auxiliary control unit and the primary control unit, and an external signal unit that is in electronic communication with the primary control unit. The external signal unit is not in electronic communication with the auxiliary control unit. In one embodiment, the external signal unit may be a CAN based tester.

The auxiliary control unit is configured to change from the safing mode to the scrap mode when the auxiliary control unit receives a first predetermined signal from the primary control unit, and the auxiliary control unit is configured to arm the pyrotechnic safety device when the auxiliary control unit receives a second predetermined signal from the primary control unit and the auxiliary control unit is operating in the scrap mode.

In yet another aspect, upon arming, the auxiliary control unit may remain armed only for a fixed duration.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

The invention may be more fully understood by reading the following description in conjunction with the drawings, in which.

DETAILED DESCRIPTION

The term "pyrotechnic safety device" or "PSD" refers to any vehicular automatic safety restraint containing pyrotechnics, including for example and without limitation air bags, seat belt pretensioners, deployable roll bars, deployable knee bolsters, deployable anti-submarining devices, and "pop-up" pedestrian safety hoods. The terms "deploy," "deployed," "dispose" and derivations thereof refer to a post-firing state of the pyrotechnic safety device in which substantially all the pyrotechnic gas generate has been oxidized.

Modern pyrotechnic safety devices contain electronic control units (ECU) that typically use two hardware controllers, a main microcontroller (MCU) and an independent auxiliary control unit, also referred to as safing logic, to identify a crash event and deploy PSD's. Typically, the MCU utilizes microcontroller crash algorithms to analyze crash signals and determine the location and severity of a crash. If the crash algorithms determine the crash is severe enough, the MCU sends a deployment signal to the PSD(s) corresponding to the detected crash location. The auxiliary control unit simultaneously and independently analyzes the same crash signals in order to validate the crash signal and enable safing (arming). Both the deployment signal and the safing must occur simultaneously to achieve deployment of the PSD.

Government regulations and industry standards, such as the ISO 26021 draft protocol, require the ECU to have a mechanism to dispose of undeployed, or "live" PSD's when a vehicle loses road-worthiness and the vehicle is scrapped. Under these regulations, in a scrap event, a tester sends messages (signals) over a Controller Area Network (CAN) to the ECU requesting it to dispose of the PSD's. However, CAN messages are only received by the MCU; the auxiliary control unit has no external input to validate the tester messages in parallel. Thus it is an object of the present invention to independently validate the signals sent from the external signal source and received only by the MCU, thereby achieving independent safing and deployment of a PSD in a "scrap event."

Figures 1, 1A:
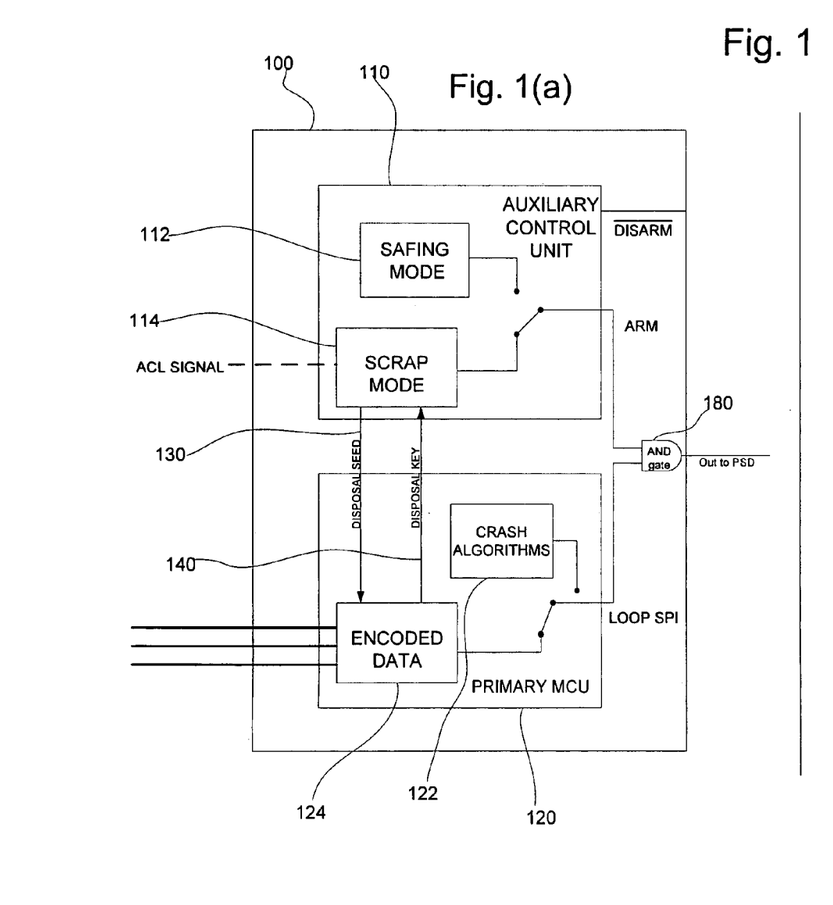
FIG. 1(a) is a system diagram for an electronic control unit according to an embodiment of the present invention.

Referring now to the Figures, wherein like reference numerals denote like elements, FIG. 1(a) illustrates an electronic control unit (ECU) 100 according to an embodiment of the present invention. The ECU 100 includes an auxiliary control unit 110, and a primary microcontroller (MCU) 120, and an AND gate 180. The auxiliary control unit 110 includes two operating modes stored in a memory: a safing mode 112, and a scrap mode 114. The MCU 120 includes crash algorithms 122 and scrap management data 124 stored in a memory. The scrap management data 124 is preferably encoded and stored in the memory of the MCU 120 in a non-executable format. The auxiliary control unit 110 and the MCU 120 are in bi-lateral electrical communication with each other, and both the auxiliary control unit 110 and the MCU are in electrical communication with the vehicle's PSD's (not shown). The AND gate 180 is also in electrical communication with the vehicle's PSD's, as well as the MCU 120 and the auxiliary control unit 110.

The auxiliary control unit 110 is configured to arm or disarm the vehicle's PSD's in one of two modes, the safing mode 112 and the scrap mode 114. The auxiliary control unit 110 is also configured to send a disposal seed 130 to the MCU 120 when the MCU 120 sends a request for the disposal seed 130 to the auxiliary control unit 110. The disposal seed 130 is preferably sent over a serial peripheral interface (SPI) at a speed greater than or equal to 2 KHz. Preferably, the auxiliary control unit 110 cannot receive signals sent over a CAN, or other communication line from a source external to the ECU 100, such as a tester.

The MCU 120 is configured to receive signals from a plurality of vehicle crash sensors (not shown), as well as signals from an external signal source, such as a tester (not shown), and signals, including the disposal seed 130, from the auxiliary control unit 110. Preferably, the MCU 120 receives the external signals over a CAN, however, it should be understood that any currently existing or later developed electronic communication line may be used to transmit signals, including for example and without limitation, an intranet, a K-line or wireless protocol. The MCU 120 is also configured to send signals to the vehicle's PSD's and to send signals, such as the disposal key 140, to the auxiliary control unit 110. Preferably, the signals are sent through a serial peripheral interface (SPI).

In operation, a disposal seed/key method may be used to arm the auxiliary control unit 110 when it is operating in the scrap mode 114, the details of which are described below in reference to FIGS. 2-5.

Figure 1B:
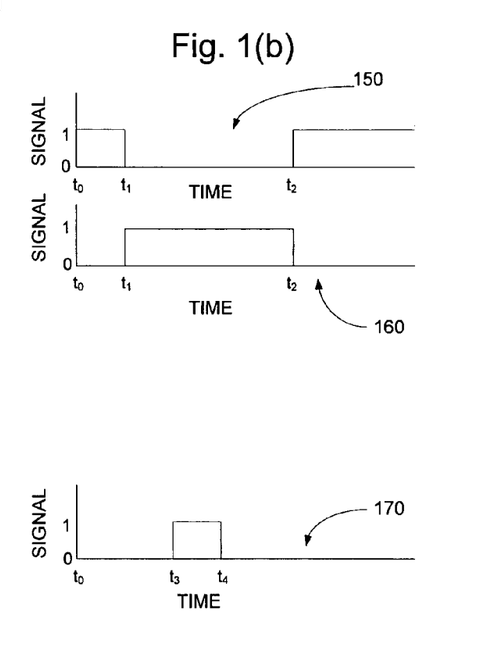
FIG. 1(b) is a timing diagram for the electronic control unit of FIG. 1(a)

FIG. 1(b) illustrates the timing behavior of the auxiliary control unit 110 and the MCU 120 of the ECU 100. At time $t_0$ the disarm function 150 is high and the arm function is low, in order to prevent inadvertent deployments. The auxiliary control unit 110 only activates the arm function 160 at $t_1$ upon independent validation that a crash sensor signal meets PSD deployment requirements, when operating in the safing mode 112, or upon receipt of a disposal key signal, when operating in the scrap mode 114. When the auxiliary control unit 110 is armed at $t_1$, disarm is low and arm is high. During the time that the auxiliary control unit 110 is armed, i.e. between $t_1$ and $t_2$, the MCU 120 sends a deployment signal 170 that is high between $t_3$ and $t_4$. The PSD may only be deployed if the deployment signal is high while the auxiliary control unit 110 arm function 160 is high. If the deployment signal is high while the arm function 160 is low and the disarm function 150 is high, the PSD cannot be deployed. As shown in FIG. 1(b), upon arming, the auxiliary control unit 110 may remain armed for a predetermined amount of time. For example, a safing window (arming window) between $t_1$ and $t_2$, which defines the period the auxiliary control unit may remain armed, may be between about 0.5 milliseconds and about 2 (two) milliseconds. Preferably, the period for which the auxiliary control unit 110 is armed is calculated by the equation:

Arming Time=Arming Lead Time+Firing Current Time+Arming Lag Time where the Arming Lead Time is determined such that the auxiliary control unit 110 is armed before a deployment signal is sent to a PSD. The Arming Lead Time may be, for example and without limitation, from about 2 (two) milliseconds to about 5 (five) milliseconds. The Firing Current Time is a hardware dependant, and pyrotechnic device dependant fixed parameter and may be set between about 0.5 milliseconds and about 2 (two) milliseconds. The Arming Lag Time (post fire arming) is additional time for which the auxiliary control unit 110 is allowed to remain armed in order to ensure that the deployment of the PSD is complete, in the event that the time required to deploy the PSD exceed the specified Firing Current Time. The Arming Lag Time may be a multiple of the Firing Current Time. For example and without limitation, the Arming Lag Time may be double the Firing Current time. Of course, it should be understood that the safing window may be calculated by other means or may be a fixed period of time. For example, the Arming Lag Time may be a fixed value from about 2 (two) milliseconds to about 3 (three) milliseconds.

The firing current may be supplied by a capacitor that is charged by a battery. Because the charge stored in the capacitor is decreased each time a new firing current is sent to a PSD, the capacitor may become discharged after, for example, firing a $12^{th}$ PSD out of 16 PSD's. In this case, although the firing command is sent via SPI, the actual firing current is only sent to the PSD after the capacitor recharges to a sufficient voltage. Thus, in order to ensure that the firing signal can be sent to the PSD while the auxiliary control unit 110 is armed and ensure deployment of the PSD, it is preferable that the Arming Time of the auxiliary control unit 110 exceed the Firing Current Time. Additionally, because capacitors typically degrade over time, the Arming Lag Time may also act to offset the diminished performance of the capacitor.

Figure 2:
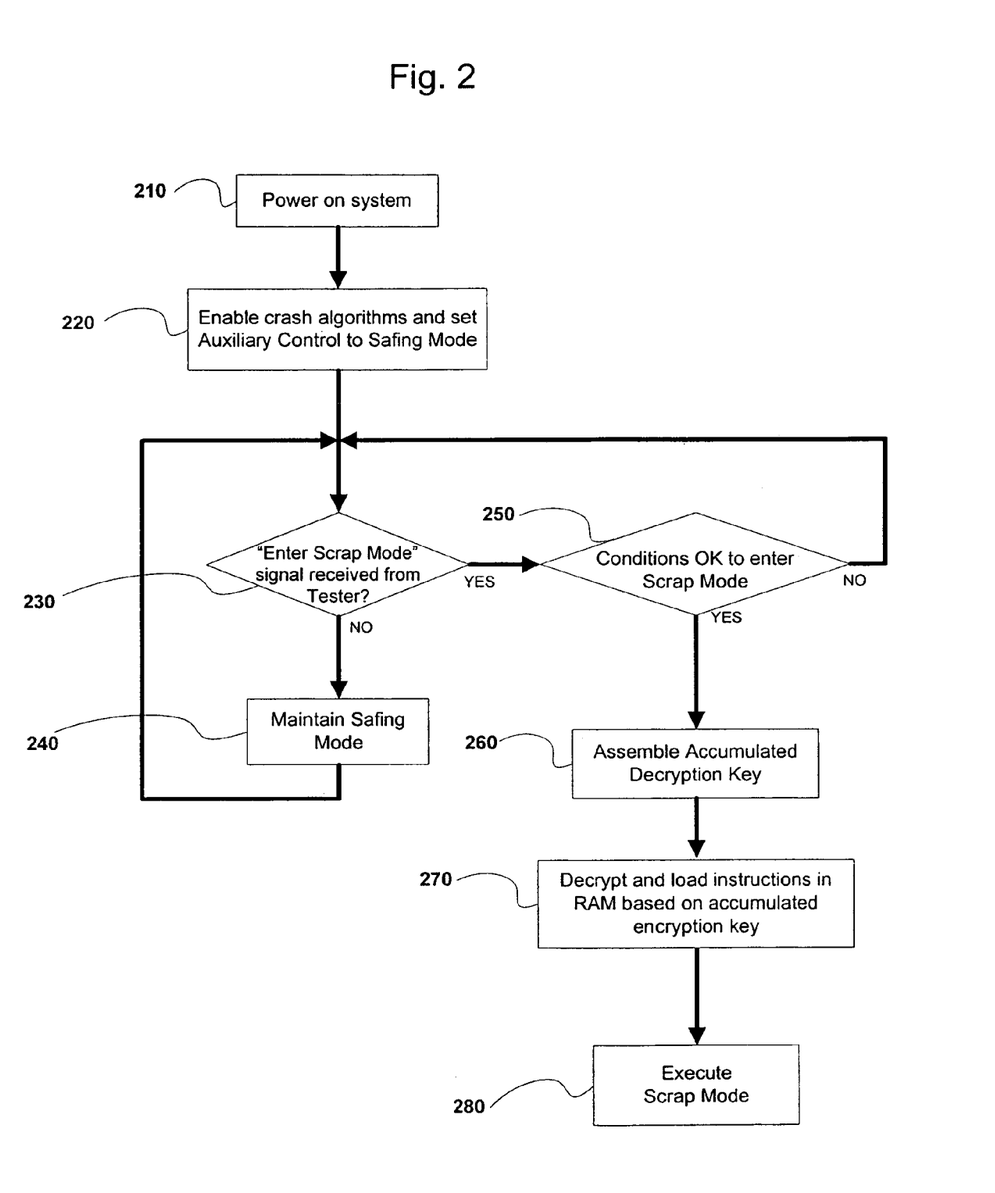
FIG. 2 is a flow chart of a fail-safe method for disposing of a pyrotechnic safety device.

FIG. 2 illustrates an example of a flow chart for a fail-safe method of disposing of a pyrotechnic safety device, according to the embodiment of FIG. 1(a). In Step 210, the ECU 100 including the auxiliary control unit 110, the MCU 120, and the AND gate 180 is powered on. The auxiliary control unit 110 is configured to operate in two modes, the safing mode 112, and the scrap mode 114. The MCU 120 may include a memory, preferably a ROM, which stores encrypted data 124 required to enable the scrap mode of the auxiliary control unit 110 and command pyrotechnic deployment of a PSD, preferably in a non-executable format. As shown in Step 220, upon power up, the auxiliary control unit 110 is set to safing mode 112 and the crash algorithms 122 are enabled. In Step 230, the MCU 120 determines whether it has received an external signal from a tester or the like to enter the scrap mode 114.

As shown in Step 240, if an external signal has not been received, the auxiliary control unit 110 remains in safing mode, and the MCU 120 continues to monitor for an external signal to enter the scrap mode 114. However, if the MCU 120 determines that it has received an external signal to enter the scrap mode 114, the MCU 120 then determines whether the conditions defined by the ISO 26021 draft protocol for entering the scrap mode 114 have been met, as shown in Step 250. If the predetermined conditions have not been met, the auxiliary control unit remains in sating mode 112, and the MCU 120 continues to monitor for a new external signal to enter the scrap mode 114.

If the predetermined conditions for entering the scrap mode 114 have been met, the MCU 120 begins to assemble the decryption key (not shown) based on accumulated data the MCU 120 has received through signals sent by the external signal source over the CAN, as shown in Step 260. Preferably, the decryption key is derived solely from the hexadecimal values of the CAN signals (messages) sent to the MCU 120 by the external signal source. It is also preferable that no portion of the decryption key is contained or stored in the memory of the MCU 120 prior to receiving the external CAN signals from the external signal source. Preferably, the decryption key is selected such that all the CAN messages required to comprehensively identify a scrap event are included.

In Step 270, once the decryption key is completely assembled the MCU 120 decodes the encoded data 124 stored on the ROM of the MCU 120 into instructions in an executable format, and loads the instructions into the RAM. The decoded executable instructions may include an algorithm to periodically manage deployment control in safing hardware, instructions to command pyrotechnic deployment, instructions to calculate the disposal key 140, and predetermined signals for controlling the operating mode of the auxiliary control unit. Preferably, the MCU 120 cannot validate the correctness of the decryption key, and consequently, cannot validate the correctness of the decoded executable instructions. The MCU 120 simply assembles the decryption key from the CAN signals and decodes the encoded data 124.

Once the instructions are loaded into the RAM, the MCU 120 sends a predetermined signal decoded from the encrypted data 124 using the decryption key, to the auxiliary control unit 110 commanding it to enable the scrap mode 114. Upon entering the scrap mode 114, all of the crash algorithms 122 are suspended and the auxiliary control unit 110 stops monitoring signals from crash sensors. The predetermined signal commands the auxiliary control unit 110 to arm only upon receiving the disposal key 140 from the MCU 120, as will be described below in conjunction with FIG. 4.

Figure 3:
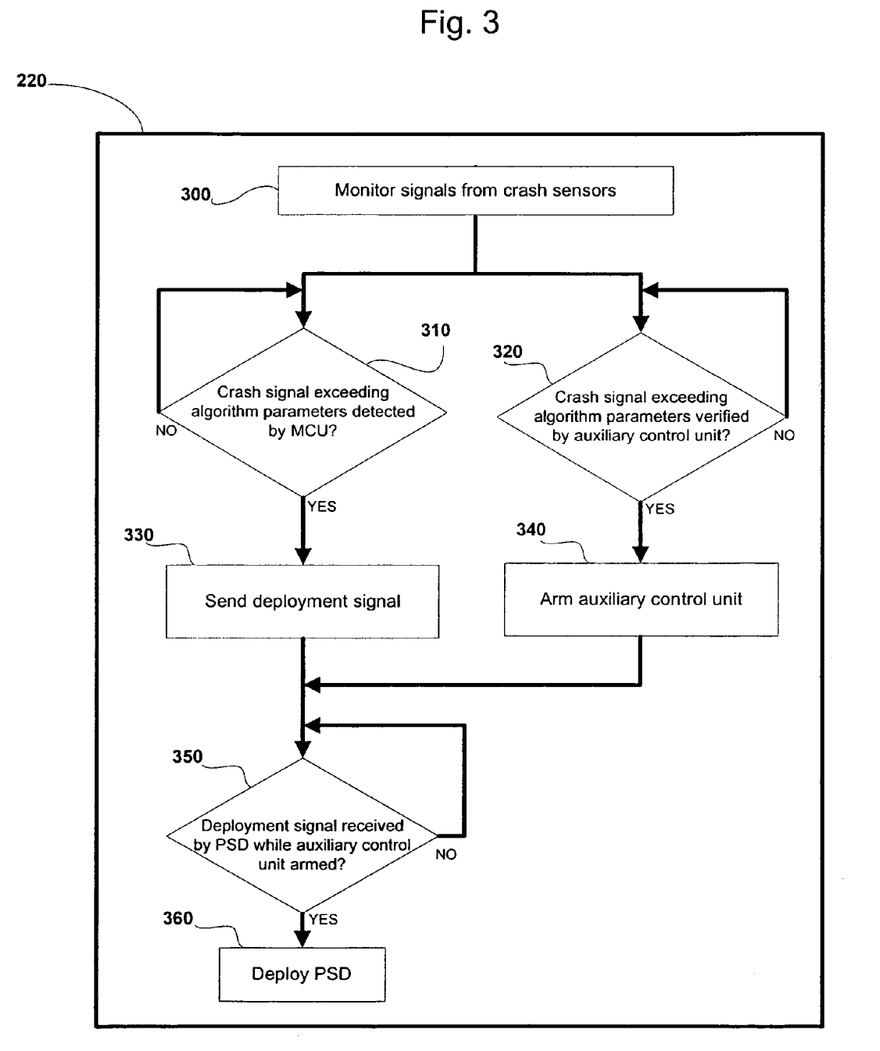
FIG. 3 is a detailed flow chart of a process of deploying a pyrotechnic safety device when the auxiliary control unit is operating in the safing mode of FIG. 2.

Turning to FIG. 3, FIG. 3 illustrates a flow chart of the safing mode execution 220 of FIG. 2, which is the normal operating mode of auxiliary control unit 110 in a non-scrap event, as well as the initial mode when the ECU 100 is powered on. As shown in Step 300, when the auxiliary control unit 110 is operating in the safing mode 112, the auxiliary control unit 110 monitors signals from an array of crash sensors located throughout the vehicle (not shown), and the MCU 120 uses crash algorithms 122 to monitor incoming signals from the array of crash sensors. The array of sensors is configured to relay information to the ECU 100 regarding decelerative forces and the location or locations of the forces.

In Steps 310, 320 if the MCU 120 receives a crash sensor signal, the crash algorithms 122 determine whether the signal meets predetermined parameters for PSD deployment, while the auxiliary control unit 110 simultaneously and independently verifies whether the signal meets the predetermined parameters, as is known in the art. If the predetermined requirements are not met, the PSD is not deployed, and the MCU 120 continues monitoring for crash sensor signals.

As shown in Steps 330, 340, if the MCU 120 crash algorithms determine, and the auxiliary control unit 110 independently verifies, that the crash signal meets the predetermined parameters for deployment, the MCU 120 sends a deployment signal to the AND gate 180. If the auxiliary control unit 110 verifies the crash signal, the auxiliary control unit 110 is armed, and the auxiliary control unit 110 sends an arming signal to the AND gate 180. If the AND gate 180 receives both the deployment signal from the MCU 120 and the arming signal from the auxiliary control unit 110 while the auxiliary control unit 110 is armed, a deployment signal is sent to the PSD's specified by the crash algorithms 122 and the specified PSD's are deployed (Steps 350, 360).

Figure 4:
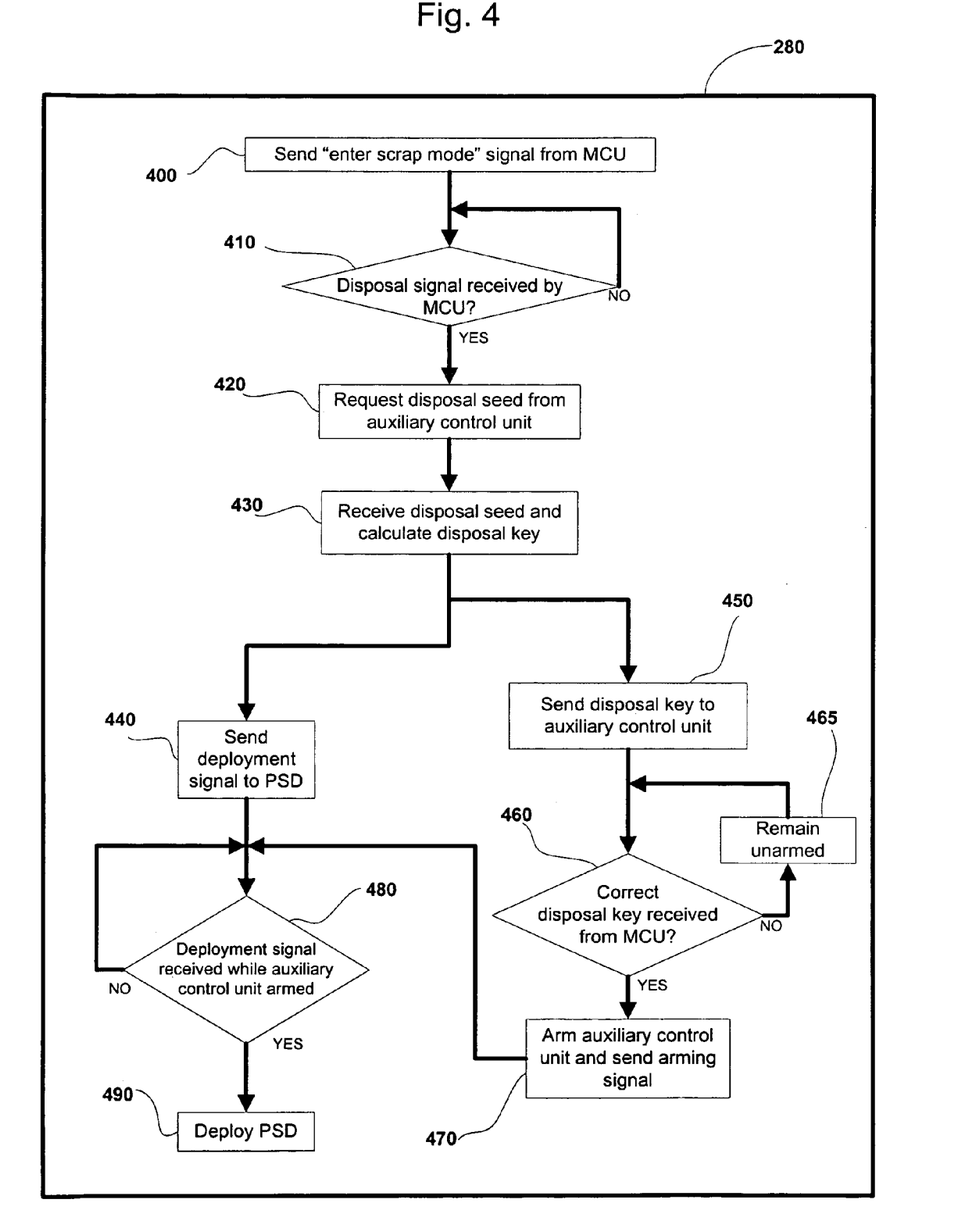
FIG. 4 is a detailed flow chart of a process of deploying a pyrotechnic safety device when the auxiliary control unit is operating in the scrap mode of FIG. 2.

FIG. 4 illustrates a flow chart for executing the scrap mode 114 shown in Step 280 of FIG. 2. The auxiliary control unit 110 is configured to enter into the scrap mode 114 only upon receipt of the predetermined signal decoded by the MCU 120 using the decryption key. When the auxiliary control unit 110 receives the decoded predetermined signal from the MCU 120, as shown in Step 400, the crash algorithms 122 of the safing mode 112 are suspended, and the auxiliary control unit 110 is only able to arm upon receipt of the disposal key 140. Note that once the auxiliary control unit 110 has entered the scrap mode 114, the auxiliary control unit 110 is preferably unable to arm through any means other than receipt of the disposal key 140.

In Step 410, when the auxiliary control unit 110 enters the scrap mode 114, the MCU 120 preferably continually monitors the CAN for a disposal signal from the external signal source. When the MCU 120 receives a disposal signal from the external signal source, the MCU 120 sends a signal to the auxiliary control unit 110 requesting the disposal seed 130 (Step 420). The disposal seed 130 may be a random number that is generated by the auxiliary control unit 110 every power cycle or at a predetermined time interval.

In Step 430, the MCU 120 receives the disposal seed 130 from the auxiliary control unit 110 and calculates a disposal key 140 based on the disposal seed 130. The MCU 120 then sends the disposal key 140 to the auxiliary control unit 110, and sends a deployment signal to the AND gate 180 (Steps 450, 440). The disposal key 140 may be a unique periodic message. The deployment signal may be an executable instruction decoded in Step 260, or may be contained in the disposal signal received from the tester. Preferably, the deployment signal and the disposal key 140 are sent in parallel from the MCU 120 through a serial peripheral interface (SPI).

Once the auxiliary control unit 110 receives the disposal key 140, the auxiliary control unit 110 determines whether the disposal key 140 received from the MCU 120 is correct (Step 460). If the disposal key 140 is incorrect, the auxiliary control unit 110 remains unarmed, and continues to monitor for a correct disposal key 140 (Step 465). However, if the auxiliary control unit 110 receives a correct disposal key 140, the auxiliary control unit 110 is armed, and as shown in Step 470, the auxiliary control unit 110 sends an arming signal to the AND gate 180.

As shown in Steps 480, 490, if the AND gate 180 receives both the deployment signal from the MCU 120 and the arming signal from the auxiliary control unit 110 while the auxiliary control unit 110 is armed, a deployment signal is sent to the PSD(s) requested by the external signal source. It should be noted that when the auxiliary control unit 110 operates in scrap mode 114, the ECU 100 is preferably limited to deployment of a single PSD upon receipt of the disposal signal from the external signal source. However, multiple PSD's may be deployed upon receipt of a single disposal signal, if the disposal signal requests multiple simultaneous deployments.

The process described above in conjunction with FIGS. 2 and 4 are repeated each time the MCU 120 receives a new disposal request from the external signal source. Additionally, because the MCU 120 is unable to verify the correctness of the decryption key and therefore, the correctness of the decoded instructions/predetermined signals, the external signal source sending the CAN messages (tester) is the sole means of commanding the auxiliary control unit 110 to enable the scrap mode 114. Thus, the auxiliary control unit 110 is armed independently of the MCU 120, thereby minimizing the risk of inadvertent deployments.

Figure 5:
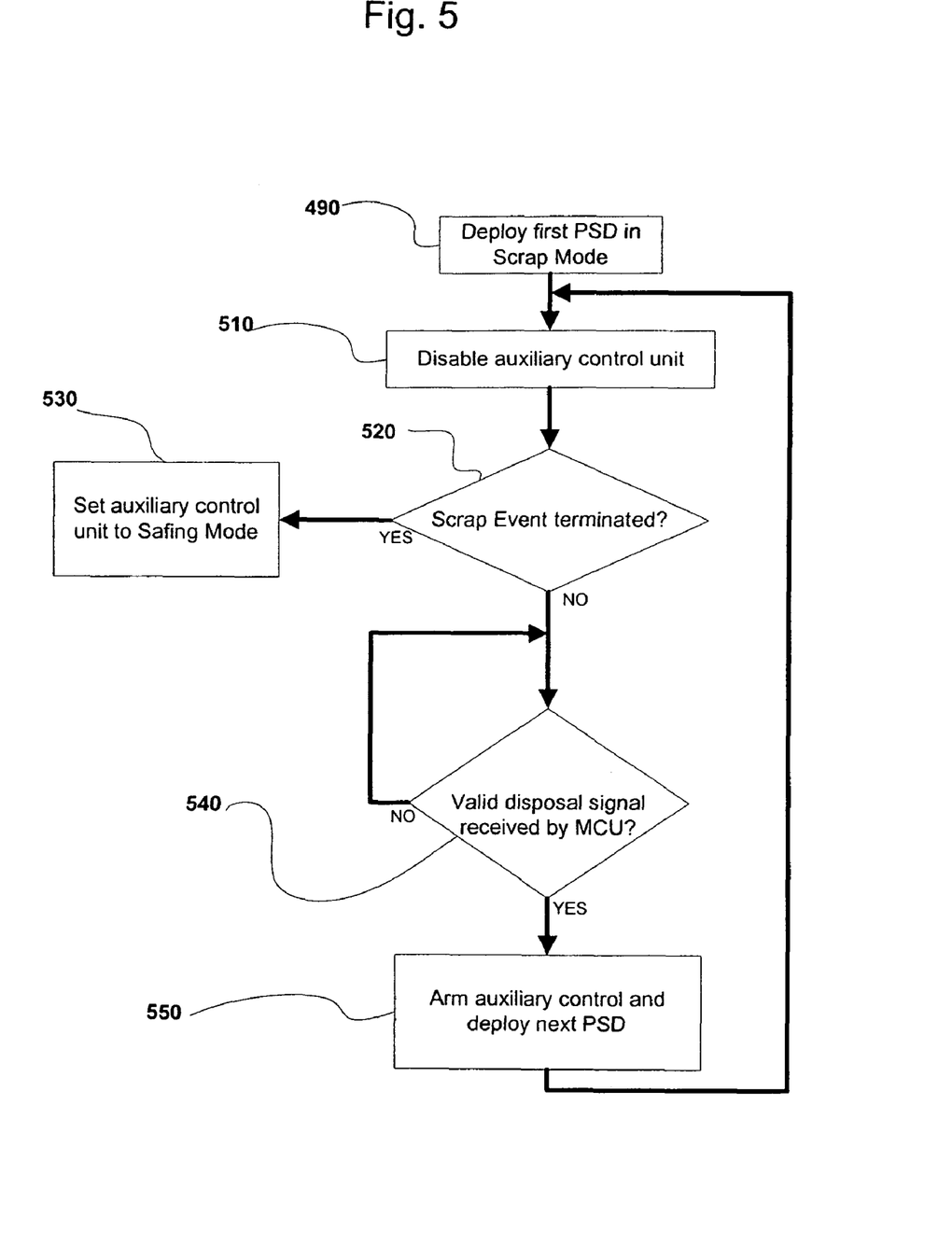
FIG. 5 is a flow chart of a process of deploying a second pyrotechnic safety device when the auxiliary control unit is operating in the scrap mode of FIG. 2.

FIG. 5 illustrates a flow chart of a method for disposing of multiple pyrotechnic devices when the auxiliary control unit 110 is operating in the scrap mode 114, and the ECU 100 is limited to deployment of a single PSD per disposal signal received from the external signal source. Following deployment of the single PSD of Step 490, the auxiliary control unit 110 is temporarily disabled in Step 510. The auxiliary control unit 110 may be disabled by sending an incorrect signal (e.g. a signal other than the correct deployment key) to the auxiliary control unit 110. After the auxiliary control unit 110 has been temporarily disabled, the MCU 120 monitors whether the scrap event has been terminated. Examples of events that would result in termination of the scrap event include resetting the ECU 100, loss of communication between the ECU 100 and the external signal source, or loss of power. If the scrap event has been terminated, the auxiliary control unit 110 is set to safing mode 112, as shown in Step 530, and the decryption key and decoded executable instructions stored in the RAM may be destroyed. Once the auxiliary control unit 110 has been set to the safing mode 112, the auxiliary control unit 110 preferably can only be set to scrap mode by the process described above in conjunction with FIGS. 2 and 4.

If, however, the scrap event has not been terminated, the MCU 120 continues to monitor for a valid disposal signal from the tester (Step 540). In the event a valid disposal signal is received by the MCU 120, the auxiliary control unit 110 is armed and the next PSD is deployed as described above in Steps 410-490. This process may be repeated until all undeployed PSD's have been disposed of.

Figure 6:
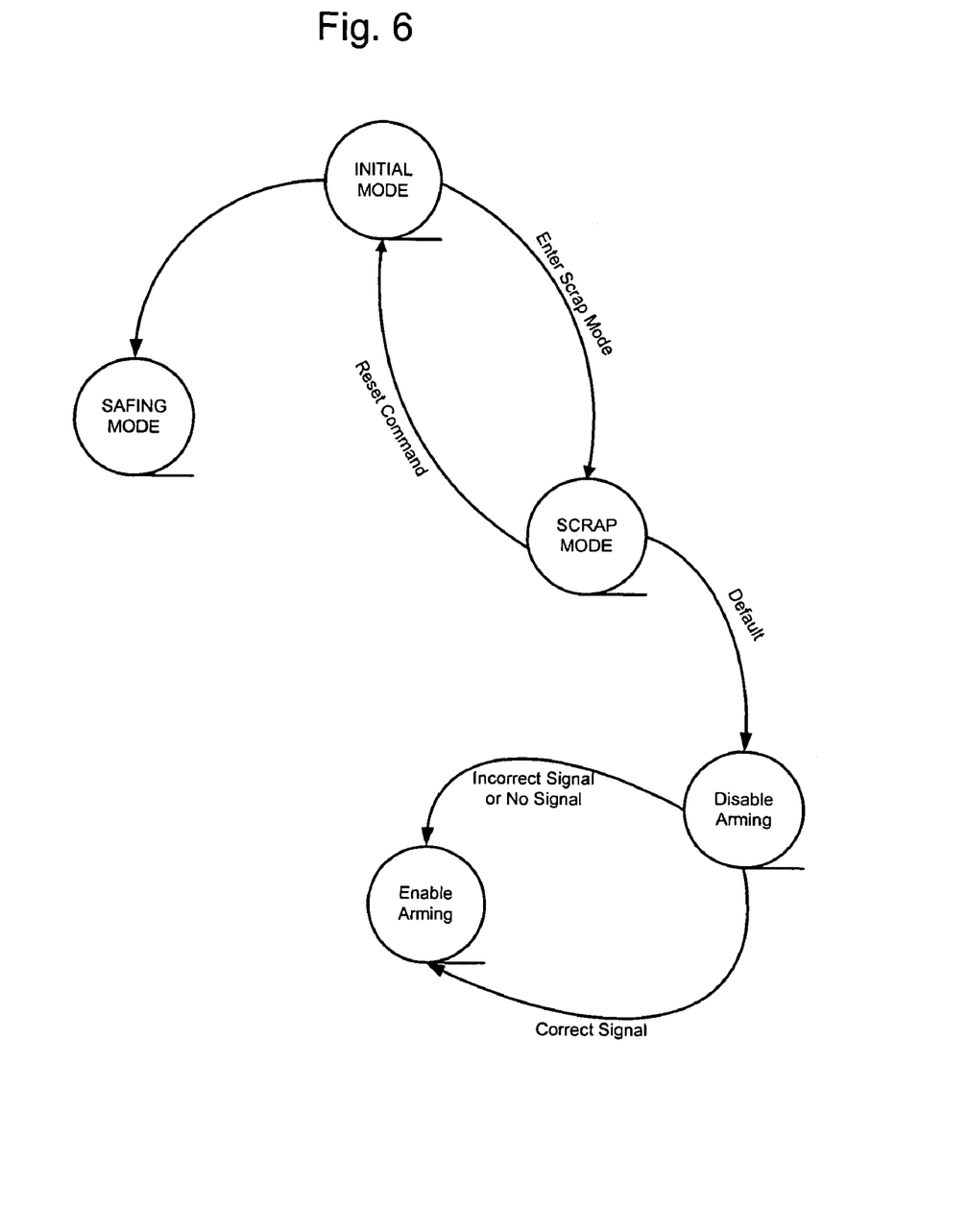
FIG. 6 is an exemplary timing diagram for a deployment of a first and second pyrotechnic safety device when an embodiment of an auxiliary control unit is operating in a scrap mode.

FIG. 6 illustrates a logic diagram for an embodiment of the auxiliary control unit 110. As described above, initially, the auxiliary control unit 110 operates in the safing mode 112. Upon receiving the predetermined message, the auxiliary control unit 110 enters the scrap mode 114, which has a default position in which arming (safing) is disabled. If the auxiliary control unit 110 receives a correct unique periodic message (disposal key 140), arming is enabled. If the auxiliary control unit 110 receives an incorrect unique message (e.g. an incorrect disposal key 140), or if the auxiliary control unit 110 does not receive any message while the auxiliary control unit 110 is armed, arming is disabled. Finally, in the event that the auxiliary control unit receives a reset command, the auxiliary control unit 110 returns to its initial state, and the safing mode 112 is enabled.

Figure 7:
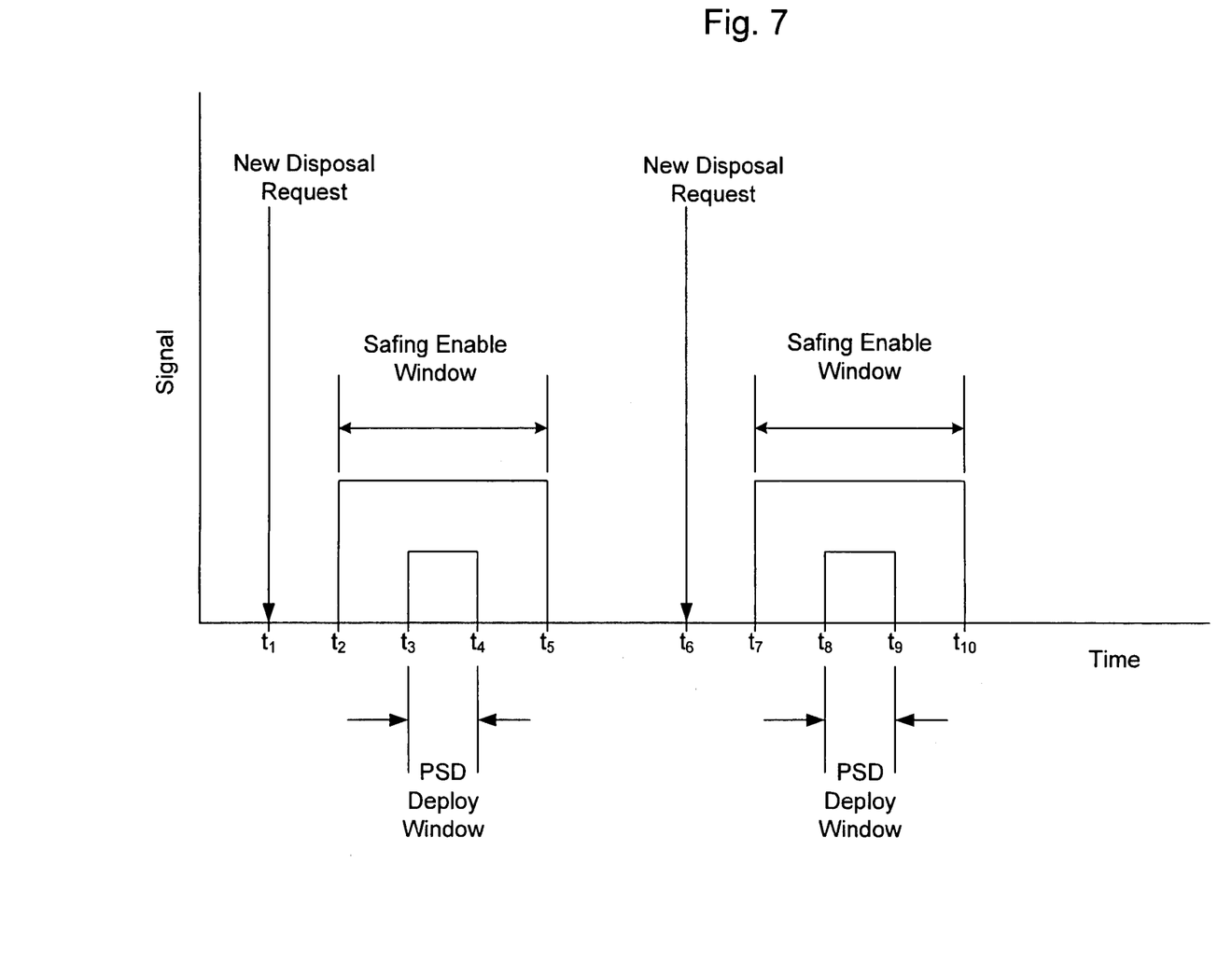
FIG. 7 is a logic diagram of an embodiment of an auxiliary control unit according to the present invention.

FIG. 7 is a timing diagram illustrating the timing function of the auxiliary control unit 110 and the MCU 120 when sequentially deploying multiple PSD's in the scrap mode 114, as discussed above with regard to FIG. 5. At $t_1$ a new disposal request signal sent from the tester is received by the MCU 120. The MCU 120 sends the disposal key 140 to the auxiliary control unit 110, and the auxiliary control unit 110 enables a safing window between $t_2$ and $t_5$ by arming the auxiliary control unit 110. The safing window includes an Arming Lead Time between $t_2$ and $t_3$, which may be, for example and without limitation, 5 (five) milliseconds, and an Arming Lag Time between $t_4$ and $t_5$, which may be, for example and without limitation, from about 2 (two) milliseconds to about 3 (three) milliseconds. If a deployment signal (Firing Current Time), represented by the PSD deploy window between $t_3$ and $t_4$, is sent by the MCU 120 to a PSD within this safing window, a first PSD will be disposed of. The deployment signal between $t_3$ and $t_4$ may be, for example and without limitation, 2 (two) milliseconds.

At $t_5$, the MCU 120 temporarily disables arming of the auxiliary control unit 110 by sending an incorrect message or signal, and the ECU is capable of receiving a new disposal request signal from the tester at $t_6$. The incorrect key may be a data element of the message sent from the MCU 120 to the auxiliary control unit 110. Note that the auxiliary control unit 110 does not reset to safing mode when an incorrect signal or message is sent to the auxiliary control unit 110, it merely disables safing temporarily. Once the new disposal request is received at $t_6$, the process is repeated for the new disposal request, and the PSD deploy window defined by $t_8$ and $t_9$ must be sent to the requested PSD within the safing window between $t_7$ and $t_{10}$. However, it should be understood that the auxiliary control unit 110 may be configured to reset to the safing mode upon receipt of the incorrect signal or message.

Thus, the present invention provides a fail-safe method for disposing of a pyrotechnic safety device that is compliant with new government regulations, such as the ISO 26021 draft protocol. Further, the present invention does not require crash sensor emulation to activate crash algorithms and safing in order to safely dispose of a PSD.

While preferred embodiments of the invention have been described, it should be understood that the invention is not so limited, and modifications may be made without departing from the invention. The scope of the invention is defined by the appended claims, and all processes and devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

We claim:

1. A method for disposing of a pyrotechnic safety device, said method comprising:
   providing an electronic control unit comprising a primary control unit and an auxiliary control unit, wherein said auxiliary control unit comprises a safing mode and a scrap mode;
   enabling said scrap mode, when said auxiliary control unit receives a first predetermined signal from said primary control unit;
   arming said auxiliary control unit only if a second predetermined signal is received by said auxiliary control unit from said primary control unit, when said auxiliary control unit is operating in said scrap mode; and
   deploying at least one pyrotechnic device by sending a deployment signal to said at least one pyrotechnic device while said auxiliary control unit is armed.

2. The method of claim 1, wherein said deployment signal is sent from said primary control unit after said primary control unit receives a signal from an external source.

3. The method of claim 2, wherein said external source is a CAN based tester.

4. The method of claim 3, wherein said primary control unit sends said first predetermined signal after receiving a first signal from an external source, and said primary control unit sends said second predetermined signal after receiving a second signal from said external source.

5. The method of claim 4, wherein said external source is a CAN based tester, and said CAN based tester is not in communication with said auxiliary control unit.

6. The method of claim 1, wherein said at least one pyrotechnic device comprises a plurality of pyrotechnic devices.

7. The method of claim 6, wherein said plurality of pyrotechnic devices comprises all pyrotechnic safety devices in electronic communication with said electronic control unit.

8. The method of claim 1, wherein said second predetermined signal and said deployment signal are sent in parallel.

9. The method of claim 1, further comprising:
   storing encrypted data in a memory of a primary control unit, said encrypted data corresponding to a plurality of predetermined signals;
   determining a decryption key based on a plurality of signals received by said primary control unit from an external source; and
   decoding at least a portion of said encrypted data using said decryption key, said at least a portion of said encrypted data corresponding to said first and second predetermined signals.

10. The method of claim 9, wherein said decryption key is determined based on hexadecimal values of each of said plurality of signals received by said primary control unit from said external source.

11. The method of claim 9, wherein said encrypted data is decrypted to an executable format.

12. The method of claim 9, further comprising:
   resetting said auxiliary control unit to said safing mode when a disposal session is terminated; and
   destroying said decryption key and said decrypted data.

13. The method of claim 12, wherein said disposal session is terminated by performing an act consisting of resetting said electronic control unit, losing power to said electronic control unit or losing communication with said external source.

14. A method for disposing of a pyrotechnic safety device, said method comprising:
   providing an electronic control unit comprising a primary control unit and an auxiliary control unit, wherein said auxiliary control unit comprises a safing mode and a scrap mode;
   sending a disposal seed from an auxiliary control unit to said primary control unit, when said auxiliary control unit is operating in said scrap mode;
   calculating a disposal key based on said disposal seed;
   arming said auxiliary control unit when said auxiliary control unit receives said disposal key from said primary control unit; and
   deploying at least one pyrotechnic device by sending a deployment signal to said at least one pyrotechnic device while said auxiliary control unit is armed.

15. The method of claim 14, wherein said disposal key is a unique periodic signal.

16. The method of claim 14, wherein said disposal seed is randomly generated.

17. The method of claim 14, wherein said disposal seed is a random number newly generated by said auxiliary control unit every power cycle.

18. The method of claim 14, wherein said first and second predetermined signals are sent in parallel.

19. A method of disposing of a pyrotechnic safety device, said method comprising:
   providing an electronic control unit comprising a primary control unit and an auxiliary control unit, wherein said auxiliary control unit comprises a safing mode and a scrap mode;
   arming said auxiliary control unit only if a first predetermined signal is received by said auxiliary control unit from said primary control unit, when said auxiliary control unit is operating in said scrap mode;
   deploying a first pyrotechnic device when said primary control unit receives a first disposal signal from an external source;
   disarming said auxiliary control unit;
   rearming said auxiliary control unit only if a second disposal signal is received by said primary control unit; and
   deploying a second pyrotechnic device when said primary control unit receives said second disposal signal from said external source.

20. The method of claim 19, wherein said auxiliary control unit is disarmed by sending any non-disposal signal to said primary control unit.

21. The method of claim 19, wherein said auxiliary control unit is armed for a predetermined period of time.

22. A system for disposing of a pyrotechnic safety device, comprising:
   an electronic control unit comprising an auxiliary control unit and a primary control unit, wherein said primary control unit is in electronic communication with said auxiliary control unit, and said auxiliary control unit is configured to operate in a safing mode and a scrap mode;
   a pyrotechnic safety device in electronic communication with said auxiliary control unit and said primary control unit;
   an external signal unit in electronic communication with said primary control unit and not in electronic communication with said auxiliary control unit;
   wherein said auxiliary control unit is configured to change from said safing mode to said scrap mode when said auxiliary control unit receives a first predetermined signal from said primary control unit, and said auxiliary control unit is configured to arm said pyrotechnic safety device when said auxiliary control unit receives a second predetermined signal from said primary control unit and said auxiliary control unit is operating in said scrap mode.

23. The system for disposing of a pyrotechnic safety device of claim 22, wherein said external signal unit communicates with said primary control unit through a CAN.

* * * * *